United States Statutory Invention Registration [19]

[11] Reg. Number: H729

Wallace et al. [43] Published: Feb. 6, 1990

[54] AROMATIC POLYISOIMIDES

[75] Inventors: J. Shield Wallace, Albuquerque, N. Mex.; Fred E. Arnold, Centerville, Ohio

[73] Assignee: The United States of America as represented by the Secretary of the Air Force, Washington, D.C.

[21] Appl. No.: 249,613

[22] Filed: Sep. 26, 1988

[51] Int. Cl.[4] ..... C08G 73/10
[52] U.S. Cl. ..... 528/342; 528/183
[58] Field of Search ..... 528/353, 125, 128, 172, 528/188, 352

[56] References Cited

U.S. PATENT DOCUMENTS

| | | | |
|---|---|---|---|
| 4,438,273 | 3/1984 | Landis | 528/353 |
| 4,485,231 | 11/1984 | Landis | 528/125 |
| 4,495,342 | 1/1985 | Landis | 528/125 |
| 4,496,711 | 1/1985 | Landis | 528/125 |
| 4,654,223 | 3/1987 | Araps et al. | 427/12 |

*Primary Examiner*—John F. Terapane
*Assistant Examiner*—Chhaya Sayala
*Attorney, Agent, or Firm*—Donald J. Singer; Charles E. Bricker

[57] ABSTRACT

There are provided polyisoimides having repeating units of the formula

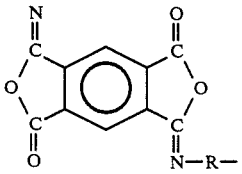

I wherein R is selected from the group consisting of

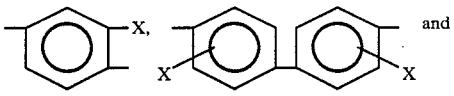

and

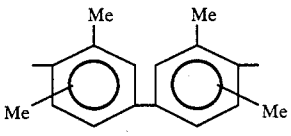

wherein Me is —$CH_3$ and wherein X is

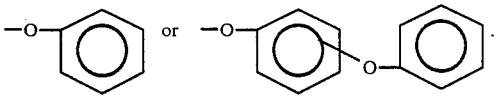

The polyisoimides of the present invention are soluble in a variety of solvents, including DMAC, THF and the like.

The polyisoimides of the present invention are used to produce cured resins having high strength and temperature characteristics as well as low void contents. Curing is effected by heating the polyisoimides at temperatures ranging from about 200° C. to about 370° C.

8 Claims, No Drawings

---

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

AROMATIC POLYISOIMIDES

RIGHTS OF THE GOVERNMENT

The invention described herein may be manufactured and used by or for the Government of the United States for all governmental purposes without the payment of any royalty.

BACKGROUND OF THE INVENTION

This invention relates to aromatic polymers. In particular, this invention relates to aromatic isoimide polymers.

Considerable research effort has been directed toward the synthesis of rigid rod polymers for their unique ordering properties that provide extremely high modulus/high strength films and fibers. One class of materials of particular interest is the aromatic heterocyclic bisbenzazole polymers. These polymers exhibit excellent thermal and thermooxidative stabilities. Another class of materials having comparable high temperature properties is the aromatic polyimides. The polyimides are attractive, not only for their high temperature properties, but also because of the low cost of the diamine and dianhydride monomers used in their synthesis.

An aromatic polymide with the desired para-ordered geometry and be prepared from pyromellitic dianhydride (PMDA) and p-phenylene-diamine. High molecular weight polyamic acid has been prepared in dimethylacetamide (DMAC) using these monomers; however, thermal or chemical cyclodehydration leads to an insoluble, infusible material. Fabrication of this material is normally carried out via the DMAC-soluble polyamic acid which produces two units of water per repeat unit during high temperature thermal cyclodehydration to the imide structure. The water produced by this process limits the utility of this material, particularly in the fabrication of thick components.

It is known that certain polyisoimides can be used to form the corresponding polyimides by thermal curing. Such polyisomides may be prepared by reacting a carboxylic acid dianhydride with a tetravalent aromatic diamine to produce a polyamic acid, and treating the resulting polyamic acid with a dehydrating agent to produce the corresponding polyisoimide. The polyisoimide to polyimide route is attractive from the standpoint that in the course of thermal curing no water vapor is released which could cause voids or defects in thick components. In general, the soluble polyisoimides prepared from aromatic diamines disclosed in the prior art are not linear, i.e., that portion of the polymer backbone contributed by the diamine is either not para-oriented with respect to the amino groups, or contains a non-linear constituent.

As mentioned previously, the aromatic polyimide prepared from pyromellitic dianhydride and p-phenylene diamine has the desired para-ordered geometry. This polymer has attractive high temperature properties and low cost. Unfortunately, when prepared via the soluble polymic acid route, the utility of the polymer is limited because of the water produced in the thermal cyclodehydration step.

We attempted to prepare a polyimide from pyromellitic dianhydride and p-phenylene diamine via the polyisoimide to polyimide route. We found that the polyisoimide prepared from these monomers was insoluble in all the solvents tested.

Accordingly, it is an object of the present invention to provide soluble polyisoimides which can be thermally rearranged to para-ordered polyimides.

It is another object of the present invention to provide a method for preparing soluble polyisoimides.

Other objects and advantages of the present invention will be readily apparent to those skilled in the art.

SUMMARY OF THE INVENTION

In accordance with the present invention, there are provided polyisoimides having repeating units of the formula

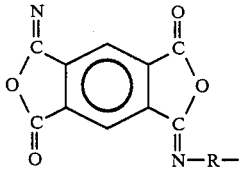

I wherein R is selected from the group consisting of

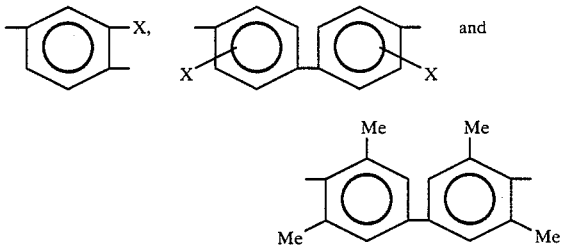

wherein Me is $—CH_3$ and wherein X is

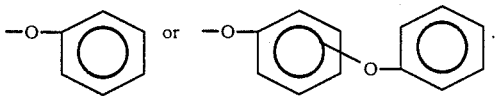

The soluble polyisoimide I can be thermally rearranged to provide a rigid rod polyimide having repeating units of the formula

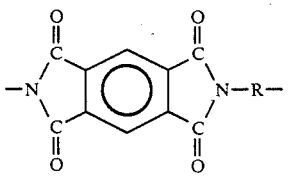

wherein R is as described previously.

The polyisoimide I is prepared by reacting pyromellitic dianhydride with an aromatic diamine having the formula $H_2N—R—NH_2$, wherein R is as described previously, to form the corresponding polyamic acid. The resulting polyamic acid is then dehydrated to form the corresponding polyisoimide.

Suitable diamines include, for example, 2-phenoxy-1,4-diaminobenzene dihydrochloride, 2-(3-phenoxy phenyleneoxy)-1,4-diaminobenzene dihydrochloride, 3,3'-bis-phenosy-p-benzidine, 3,3'-bis(3-phenoxy phenyleneoxy)-p-benzidine, and 2,6,2',6'-tetramethyl-p-benzidine.

Preparation of the substituted p-phenylene diamine monomers is described in our co-pending application Ser. No. 07/249,574, filed of even date, which is incorporated herein by reference. The tetramethyl-p-benzidine monomer is commercially available. Preparation of the remaining substituted p-benzidine monomers is described in our co-pending application Ser. No., 07/249,621, filed of even date, which is incorporated herein by reference.

The reaction between the carboxylic acid dianhydride and the diamine is preferably carried out in the presence of a solvent. It has been found that dimethylacetamide (DMAC) is a preferred solvent, although other solvents, such as tetrahydrofuran (THF) or dioxane, may also be employed.

The temperature at which the reaction is carried out is not critical and depends, to some extent, on the particular reactants being used. Best results are usually obtained when the reaction temperature is maintained below about 100° C. Higher temperatures can cause the resulting polyamic acid to cyclize to the corresponding ionide.

After the reaction has been completed, the product is in the form of a polyamic acid which can be converted to the corresponding isoimide polymer through the use of a cyclization as dehydrating agent. The temperature at which cyclization is carried out is preferably a temperature in the range of about 0° C., to about 75° C., more preferably about 0° C., to about 30° C. The dehydrating agent should be one which is soluble with a polymic acid in the reaction mixture, is capable of cyclizing a polyamic acid at the aforesaid reduced temperatures, does not adversely affect the solubility of any of the reactants in the reaction mixture and does not promote undesirable side effects. Suitable dehydrating agents include N,N'-dicyclohexyl carbodiimide (DCC), trifluoro-acetic anhydride, and the like.

The polyisoimides of the present invention are soluble in a variety of solvents, including DMAC, THF and the like.

The polyisoimides of the present invention are used to produce cured resins having high strength and temperature characteristics as well as low void contents. Curing is effected by heating the polyisoimides at temperatures ranging from about 200° C. to about 370° C.

The following examples illustrate the invention:

EXAMPLE I

A 500-ml, three-necked, round-bottom flask was fitted with a mechanical stirrer and nitrogen inlet/outlet. The flask was charged (under nitrogen) with 3,3',5,5'-tetramethyl p-benzidine (3.04219 g. 12.657 mmol), pyromellitic dianhydride (2.7604 g, 12.6570 mmol) and 58.02 g of freshly distilled DMAC. After stirring at room temperature for 2 h, all of the starting materials dissolved and significant increase in the reaction mixture viscosity was noted. The reaction mixture was stirred (at room temperature) for an additional 12 h, then diluted with 246.95 g of anhydrous DMAC and 1.45 g of anhydrous lithium chloride. The mixture was stirred for 1 h, after which all lithium chloride had dissolved. To this solution. DCC (4.933 g, 23.91 mmol) was added with stirring causing a rapid color change (dark red). The reaction mixture was stirred at room temperature for 12 h, poured into 2400 ml of fresh isopropanol, and stirred for 2 h. A bright red-orange precipitate was collected on a course fritted funnel (keeping the material covered with alcohol), washed with three 200-ml portions of fresh isoproganol and finally washed with three 200-ml portions of anhydrous benzene. The final flurry of benzene and product was freeze dried at 0.1-mm Hg for 72 h. Yield: 5.82 g (100.3%) of a bright red-orange fibrous solid.

EXAMPLE II

The procedure of Example I was generally followed using 3,3'-phenoxy-p-benzidine.

EXAMPLE III

The procedure of Example I was generally followed using 3,3'-(3-phenoxy phenyleneoxy)-p-benzidine.

EXAMPLE IV

A 100-ml resin kettle was fitted with a four-necked ground-glass top, mechanical stirrer, and nitrogen inlet/outlet. The kettle was charged with 2-(3-phenoxy-phenyleneoxy)-1,4-diaminobenzen dihydrochloride (0.6252 g, 1.712 mmol), pyromellitic dianhydride (0.3734 g, 1.712 mmol), lithium carbonate (0.1130 g, 1.883 mmol) and 9.02 of freshly distilled DMAC. After stirring at room temperature for a few minutes, evolution of gas was noted and continued for ½ h. The light-yellow reaction mixture was stirred at room temperature for 12 h, diluted with 43.50 g of anhydrous DMAC, and stirred for an additional hour. To the solution, DCC (0.7205 g, 3.492 mmol) was added with stirring, causing a rapid color change (dark red). The reaction mixture was stirred at room temperature for 12 h, poured into 500 ml of fresh isopropanol and stirred for 2 h. A bright red-orange precipitate was collected on a medium fritted glass funnel, dried briefly under vacuum, redissolved in 50 ml of THF. and reprecipitated in 500 ml of isopropanol. The collected (suction filtration) red-orange solid weiqhed 0.86 g (98%) after drying at 40° C., for 48 hours.

EXAMPLE V

The procedure of Example IV was generally followed using 2-phenoxy-1,4-diamino-benzene dihydrochloride.

Various modifications may be made without departing from the spirit of the invention or the scope of the appended claims.

We claim:

1. A polyisoimide having repeating units of the formula

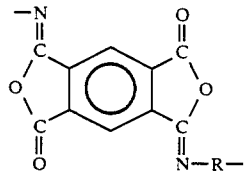

wherein R is selected from the group consisting of

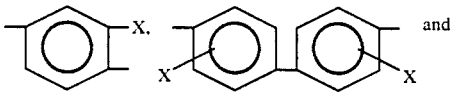

-continued

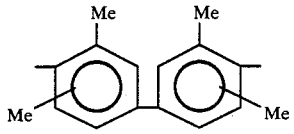

wherein Me is —$CH_3$ and wherein X is

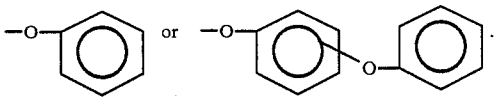

2. The polyisoimide of claim 1 wherein R is

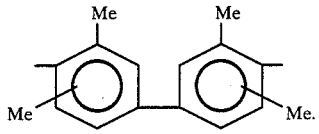

3. The polyisoimide of claim 1 wherein R is

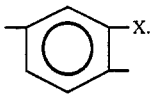

4. The polyisoimide of claim 3 wherein X is phenoxy.

5. The polyisoimide of claim 3 wherein X is phenoxyphenyleneoxy.

6. The polyisoimide of claim 1 wherein R is

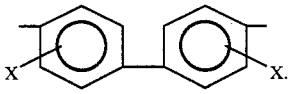

7. The polyisoimide of claim 6 wherein X is phenoxy.

8. The polyisoimide of claim 6 wherein X is phenoxyphenyleneoxy.

* * * * *